Sept. 21, 1954     H. G. FERGUSON     2,689,514
AGRICULTURAL IMPLEMENT
Filed Oct. 21, 1947     2 Sheets-Sheet 2
FIG. 9.
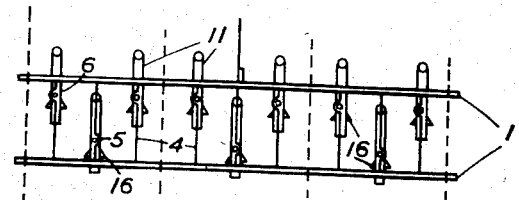
FIG. 10.
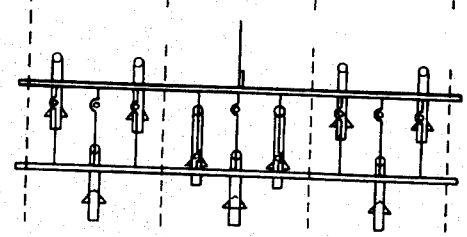
FIG. 11.
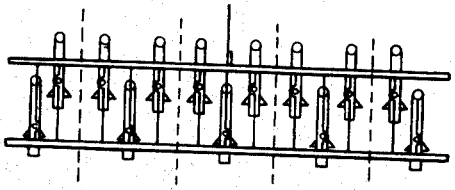
FIG. 12.
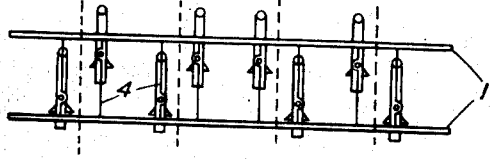
FIG. 13.     FIG. 14.
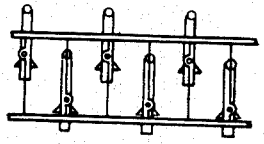 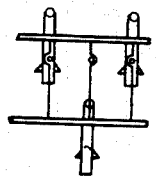
FIG. 15.
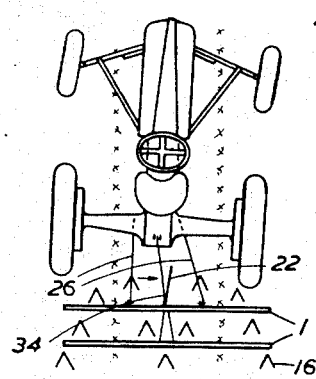
Inventor
Henry George Ferguson
By Carlson, Pitzner, Hubbard & Wolfe
Attorneys Patented Sept. 21, 1954

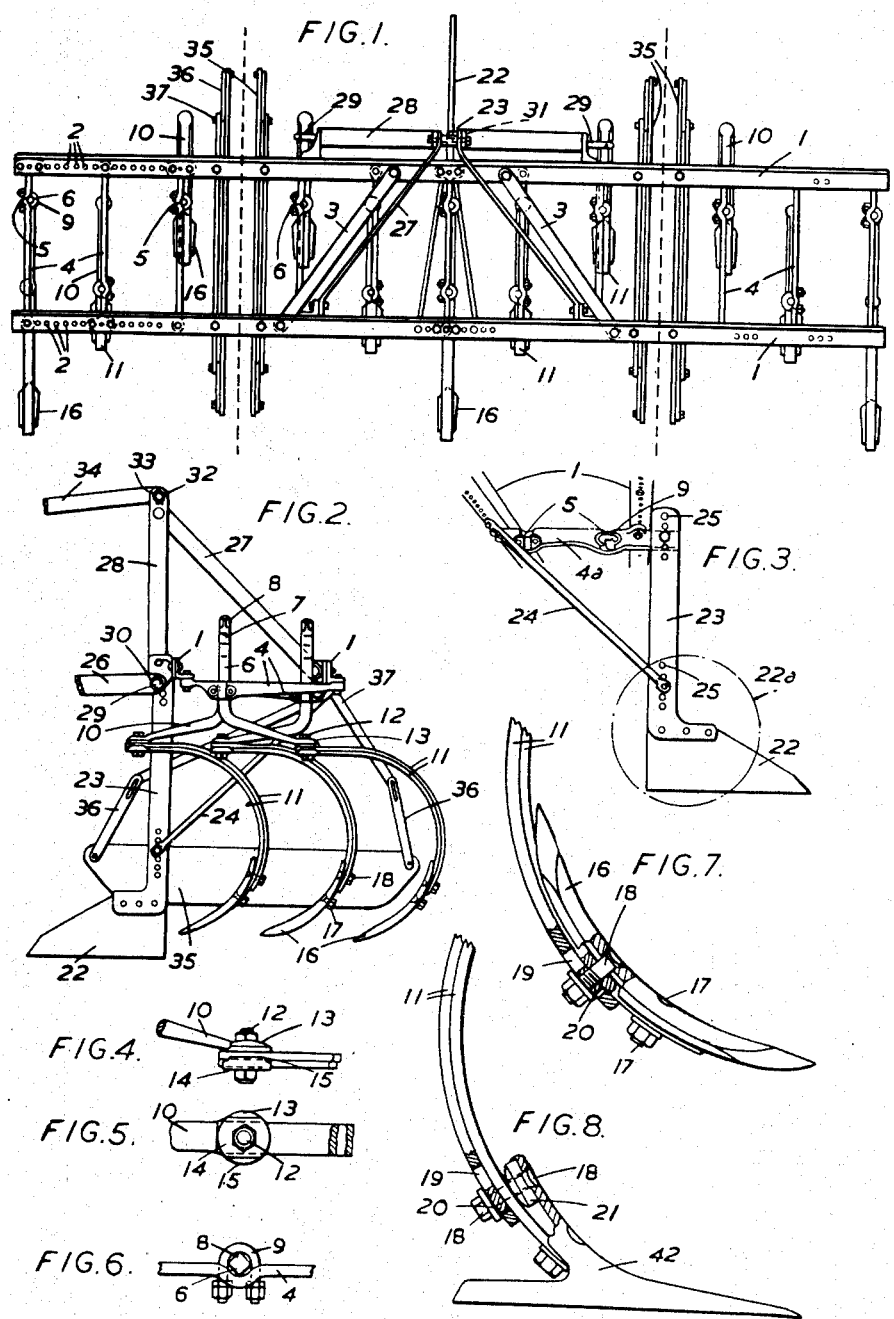

2,689,514

UNITED STATES PATENT OFFICE 2,689,514

AGRICULTURAL IMPLEMENT

Henry George Ferguson, Gloucestershire, England

Application October 21, 1947, Serial No. 781,146
In Great Britain May 22, 1941

Section 1, Public Law 690, August 8, 1946
Patent expires May 22, 1961

2 Claims. (Cl. 97—47.62)

This invention relates to cultivators or equivalent agricultural implements having a plurality of spaced soil-engaging elements, and especially to implements, such for example, as cultivators for row crop work for attachment to a tractor which embodies a three point hitch link attachment and a lifting power unit as set forth, for example, in my prior United States Patent No. 2,233,002 and which embodies means for adjusting the track of the front and rear wheels as set forth in my prior United States Patent No. 2,247,725 and my prior British patent specification No. 548,259.

An object of the invention is to provide a cultivator or equivalent agricultural implement especially for row crop work which comprises a plurality of laterally spaced soil-engaging elements, such for example, as resilient tines, a supporting frame therefor and adjustable connection means between the tines and the frame permitting lateral and fore and aft adjustment of the tines with reference to the frame and to each other, characterised in that the adjustable connection means between a tine and the frame comprises a crank member having a vertical or upwardly extending arm adjustably connected to the frame so as to be capable of angular adjustment thereon and having a further, preferably horizontal or substantially horizontal arm to which the tine or equivalent is adjustably connected so as to be capable of angular adjustment thereon.

A further object of the invention is to provide a cultivator as set forth in combination with centering or steering means as set forth in my prior United States Patent No. 2,195,516 and with a tractor having means for adjusting the track of the front wheels as set forth in my prior United States Patent No. 2,247,725 and means for adjusting the track of the rear wheels as set forth in my prior British patent specification No. 548,259.

In order that the invention may be clearly understood the following specific embodiments will now be described with reference to the accompanying drawings wherein:

Fig. 1 is a plan view of a spring tine cultivator in accordance with the invention.

Fig. 2 is a corresponding side elevation.

Fig. 3 is a perspective view showing the guiding fin.

Figs. 4 and 5 are respectively elevation and inverted plan to an enlarged scale of the joint between the spring tine and the crank arm.

Fig. 6 is a detail plan view to an enlarged scale of the connection of the crank arm to the fore and aft bar.

Figs. 7 and 8 are enlarged views, partly in section, of alternative ground-engaging parts.

Figs. 9 to 14 are diagrammatic plan views showing some of the possible groupings of the tines.

Fig. 15 is a plan view of tractor and cultivator illustrating the action of the guiding fin.

Referring to the drawings, especially Figs. 1 and 2, the cultivator consists of two spaced cross beams 1 of angle section each having a continuous series of closely pitched bolt holes 2 and connected together by diagonal bracing struts 3 which can be bolted to any selected holes 2 to give any desired spacing of the struts. The beams 1 are also connected together by fore and aft laterally spaced bars 4 each connected to any selected holes 2 by one bolt at one end and two bolts at the other. Nearer the end with the two bolts each bar is curved to form a semi-circular recess 5 to receive the vertical arm or post 6 of a crank which is provided with depth-indicating notches 7 (Fig. 2) and flats 8 to facilitate turning thereof. Each arm 6 is firmly clamped in the recess 5 by a U-bolt 9. Each crank has a substantially horizontal arm 10 to the end of which a C-shaped spring tine is pivotally clamped. The spring tine consists of two superposed curved leaf springs 11 which are clamped by a bolt 12 between a circular flat 13 on the arm 10 and a retaining plate 14 (Figs. 4 and 5) upturned at two opposite sides 15 to engage and contain the two leaf springs 11. As shown more clearly in Fig. 7 these springs have the soil-engaging part or shovel 16 detachably attached thereto. It is attached to the inner spring by a bolt 17 and by a bolt 18. The latter passes through a slot 19 in the outer spring and the nut is kept free of this spring by a collar 20. Thus the shovel 16 and bolt 18 are capable of sliding movement with reference to the outer spring 11 so that the whole tine assembly can bend back sufficiently to clear an obstruction, there being allowed during this operation a sliding movement between the two springs. Fig. 8 shows how an alternative form of soil-engaging part, in this case a sweep 42, can be similarly attached by the use of an adaptor 21 through which the bolt 18 passes or which may be formed on the bolt. It will be clearly seen that various other shapes and forms of soil-engaging parts may be similarly fitted as in Figs. 7 and 8 as desired.

The cultivator is provided with guiding means to give an automatic self-centering effect as set forth in my prior United States Patent No. 2,195,516. This means consists of a fin 22 having a vertical resilient stem 23 near the end thereof bolted to the central bar 4a which is specially extended. It will be noted that this bar has two recesses 5 instead of only one, this being necessary as this bar could not be reversed like the others, without detaching the fin, for adjustment of the tine as later explained. The stem is braced by struts 24 connected to the rear bar 1 and allowing torsional movement of the stem as set forth in said prior Patent No. 2,195,516. The fin is usually set to run about 3 inches below the shovels but this may be varied to suit different soil conditions, suitable series of bolt holes 25 being provided in the stem to allow of vertical adjustment. The use of the fin is especially important in row crop work and it enables the use of rear cultivators as opposed to cultivators forward of the rear wheels, the work of which cultivators is at least partly negatived by the oncoming rear wheels.

Fig. 15 shows the action of the fin in conjunction with spaced forwardly convergent links 26 as disclosed, for example, in my prior United States Patent No. 1,916,945. If, for example, the operator allows the tractor to get too close to the crop as shown at the right rear wheel, he then steers the tractor central again as shown by the front wheels.

The instant the front wheels are turned to steer the tractor back to the center of the row, a heavy soil pressure is imposed all along the side of the fin, as indicated by the arrow. This causes the fin to deflect and steer the implement as shown.

On hillsides the tendency of the implement to fall away puts a soil pressure along the down side of the fin. This steers the implement up the hill and keeps it in the correct position.

Instead of a fixed blade, the fin may consist of a rolling blade 22a as indicated in chain dotted lines. This rolling fin is especially useful for trashy land.

The bars 1 have an upstanding frame structure consisting of members 27, 28 having laterally spaced pins 29 for engagement with universal balls 30 in the laterally spaced draft links 26. The members 28 have apertures 31 at the top adapted to receive a pin 33 adapted to pass through a universal ball 32 in the top link 34. These links 26, 34 are universally attached to the well known Ford-Ferguson tractor, being adapted to operate and be controlled substantially as described, for example, in my prior United States Patent No. 2,233,002 and my prior patents referred to therein. As there described, the draft links 26 and upper link 34 are operable in response to changes in draft load reflected by changes in the forward rocking force on the implement, acting about the pivotal connecting pins 29 and universal balls 30, imposed by soil reaction against the soil-engaging parts of the implement.

The tines 11, 16 are capable of extensive adjustment. In the first place they can be readily adjusted vertically with reference to the bars 4 by loosening the U-bolts, the graduations 7 being provided to facilitate adjusting them to predetermined heights. Secondly, they can readily be adjusted laterally by attaching the bars 4 in any selected holes 2. They can also be adjusted fore and aft by having the crank arm 10 projecting forwardly (see the tine third from the left side Fig. 1) or rearwardly (see the extreme left tine in Fig. 1). Further fore and aft adjustment can be made by reversing the bar 4 (see the second end tine at the left hand side of Fig. 1). Finally, a fine lateral and fore and aft adjustment can be made if desired by angling the crank arms 10 from the various fore and aft positions. In such cases the springs 11 would be correspondingly angled with reference to the arms 10 at the clamping bolts 12 in order to keep the tines in a true fore and aft direction. The last mentioned adjustment is especially useful in cases where the structure of the frame is such as to necessitate angles, webs or the like which break the even spacing of the holes 2.

It will be seen with reference to the drawings, that the offset locations of the clamping recesses 5 are correlated with the length of the substantially horizontal crank arms 10 to permit positioning of the free end of the crank arm 10 in the region of or preferably ahead of the implement hitch pins 29, 30 in at least one selected crank position. This is illustrated by the extreme left tine in Fig. 2 in which the fore-and-aft bar 4 is mounted to present the clamping recess 5 in the forward position and the crank arm 10 is angularly rotated to the forward direction. As thus positioned, it will be seen that the spring tine and its soil-engaging element are forwardly positioned with the center of gravity of the tine assembly lying substantially beneath the hitch pins 29, 30. In the present instance, the center of gravity of the extreme left tine of Fig. 2 is slightly behind the vertical center line of the pins when the cultivator is in operative position.

Such correlation of the location of the clamping recess 5 and horizontal crank arm 10 is highly advantageous in relation to the draft responsive hitch linkage, described above. The presently described spring tine cultivator is of the class of implements often referred to as "light draft" implements, and, as such, full utilization of the forces imposed on the tine by soil reaction is desirable for actuating the draft responsive hitch mechanism.

In the present instance, such utilization of the draft forces is accomplished by the previously described correlation permitting the forward mounting of the spring tines in at least one position. The resulting close coupling of the soil engaging parts in relation to the hitch connections minimizes rearwardly overhanging implement weight counteracting the forward rocking draft forces, and insures effective transmission of the forward rocking forces to the upper draft responsive link 34. Such positioning for a variety of applications and soil conditions is illustrated in Figs. 1, and 9 to 14, where a variety of echelon arrangements of tines are shown with the leading tines always located in their foremost position.

Fig. 1 shows a setting for cultivating two crop rows indicated by dotted lines.

Fig. 9 shows a setting for cultivating the equivalent of three rows, that is, two rows and two half rows.

Fig. 10 shows a setting similar to Fig. 9 but with more fore and aft clearance for trashy ground.

Fig. 11 shows a setting for cultivating four complete rows.

Fig. 12 shows a setting for cultivating four rows.

Fig. 13 shows a setting for light general cultivation and Fig. 14 shows a similar setting with more clearance for trashy soil. For very trashy soil the arrangement in Fig. 14 could be modified by increasing the lateral spacing and reducing the number of tines. For general cultivation as distinct from row crop work the guiding fin may be omitted.

It will be seen from the above that the invention provides a cultivator which can be readily assembled and adjusted to give a wide variety in the spacing, number of and kind of soil engaging parts to be used.

As shown in Fig. 1, fenders 35 may be provided at any desired spacing, being attached by slotted links 36 to arms 37 attached to the bar 1 so that they can freely rise and fall in operation.

The flexibility of lateral adjustment in the tines can only be employed to maximum advantage with a tractor whose wheels offer also a wide range of adjustment. This is provided for in that the tractor diagrammatically shown has a front axle arrangement in accordance with my prior United States Patent No. 2,247,725 which provides a wide range of adjustment and a rear wheel adjustment as set forth in my prior British patent specification No. 548,259.

I claim:

1. A cultivator adapted for use on a tractor hitch linkage having a pair of laterally spaced power elevated draft links and an upwardly spaced draft responsive link pivoted on the tractor at their forward ends for bodily swing and operable in response to forward rocking force imposed on the upwardly spaced link, comprising, in combination, a frame including a pair of transverse beams spaced apart fore-and-aft, means on said frame for detachably connecting the frame to the trailing ends of the three links of said tractor linkage to support said frame thereon and impart forward rocking force to the upper link, a series of C-shaped spring tines having soil engaging tools at their lower ends, a series of crank members each having a substantially horizontal arm and a vertical shank, means on the free end of each of said horizontal arms engageable with the upper end of one of said tines to hold the same in a normal forwardly facing position regardless of the angular positioning of the crank arm, a series of fore-and-aft bars having means for detachably mounting the bars on said frame beams in side-to-side relation and with either end disposed at the forward end of the frame, each of said bars having a clamp offset from the midpoint thereof for detachably clamping said vertical posts of said crank arms in selected vertical and angularly rotated positions to permit positioning of said tines in a variety of arrangements having individual tines offset forwardly and laterally of other tines, the amount of said offset of said clamps being correlated with the length of said crank arms to locate the holding means on said crank arm forwardly of said frame connecting means in at least one of the endwise positions of said bars and angular rotation of said crank arm to thereby position the forwardmost of said tines with their soil engaging tools in the region substantially below said frame connecting means.

2. A cultivator for use with a tractor having a pair of power elevated draft links and an upwardly spaced draft responsive link, said links being universally pivoted at their forward ends for bodily swing, said cultivator comprising, in combination, a frame including transverse front and rear members with longitudinal members connected therebetween, said frame having means adjacent its forward portion for detachably connecting said frame to the trailing ends of the said links, a series of spring tines having soil-engaging elements at their lower ends, means for supporting said tines on said frame including a series of crank members each having a vertical shaft portion and a substantially horizontally extending crank arm, a series of clamps on the longitudinal frame members for holding said vertical shaft portions of said crank members, each of said crank arms having provision at its free end for holding the upper portion of one of said tines in a selected angular position, said clamps being positionable selectively in laterally spaced positions and in forward and rearward positions on said frame and operative to hold the said shaft portions of said crank members in selected vertical and angular positions of said crank members for securing said tines in a variety of settings of lateral spacing and fore-and-aft spacing between tines, the forward selective position of said clamps being related to the length of the crank arms and position of said frame connecting means for positioning the free ends of the crank arms holding the foremost tines of such settings ahead of a vertical plane through said frame connecting means in at least one selective position of said crank arm.

References Cited in the file of this patent

UNITED STATES PATENTS

| Number | Name | Date |
|---|---|---|
| 27,106 | Carey | Feb. 4, 1860 |
| 984,042 | Smith | Feb. 14, 1911 |
| 1,424,552 | Bronson | Aug. 1, 1922 |
| 1,560,362 | Anderson | Nov. 3, 1925 |
| 1,734,408 | Thompson | Nov. 5, 1929 |
| 1,805,481 | Dyrr | May 19, 1931 |
| 1,838,355 | Benjamin | Dec. 29, 1931 |
| 1,900,440 | Ferguson | Mar. 7, 1933 |
| 1,982,862 | Erdman | Dec. 4, 1934 |
| 2,005,568 | Smith | June 18, 1935 |
| 2,180,910 | Reynolds | Nov. 21, 1939 |
| 2,195,516 | Ferguson | Apr. 2, 1940 |
| 2,209,804 | Ashley | July 30, 1940 |